(12) United States Patent
Takeda

(10) Patent No.: US 11,043,348 B2
(45) Date of Patent: Jun. 22, 2021

(54) TEMPERATURE ACTUATED SWITCH

(71) Applicant: Uchiya Thermostat Co., Ltd., Saitama (JP)

(72) Inventor: Hideaki Takeda, Saitama (JP)

(73) Assignee: Uchiya Thermostat Co., Ltd., Saitama (JP)

( * ) Notice: Subject to any disclaimer, the term of this patent is extended or adjusted under 35 U.S.C. 154(b) by 90 days.

(21) Appl. No.: 16/493,914

(22) PCT Filed: Dec. 26, 2017

(86) PCT No.: PCT/JP2017/046730
§ 371 (c)(1),
(2) Date: Sep. 13, 2019

(87) PCT Pub. No.: WO2018/193667
PCT Pub. Date: Oct. 25, 2018

(65) Prior Publication Data
US 2020/0027679 A1 Jan. 23, 2020

(30) Foreign Application Priority Data

Apr. 18, 2017 (JP) .............................. JP2017-081987

(51) Int. Cl.
*H01H 7/16* (2006.01)
*H01H 71/16* (2006.01)
(Continued)

(52) U.S. Cl.
CPC ............ *H01H 71/16* (2013.01); *H01H 79/00* (2013.01); *H02H 9/02* (2013.01)

(58) Field of Classification Search
CPC ...... H01H 37/002; H01H 37/52; H01H 37/54; H01H 37/5418; H01H 37/5427;
(Continued)

(56) References Cited

U.S. PATENT DOCUMENTS

| 4,445,105 A | 4/1984 | Wehl |
| 2008/0169897 A1* | 7/2008 | Yang ...................... H01H 37/06 337/335 |

(Continued)

FOREIGN PATENT DOCUMENTS

| CN | 102598183 A | 7/2012 |
| JP | 3611634 Y1 | 5/1961 |

(Continued)

OTHER PUBLICATIONS

"International Application Serial No. PCT/JP2017/046730, International Search Report dated Apr. 3, 2018", (Apr. 3, 2018), 2 pgs.

(Continued)

*Primary Examiner* — Bryan R Perez
(74) *Attorney, Agent, or Firm* — Schwegman Lundberg & Woessner, P.A.

(57) ABSTRACT

A temperature actuated switch (1) includes: first and second temperature sensing sections (10, 20) that each include a contact (12, 22) and a thermally deformable member (first bimetal 11, second bimetal 21) that is bent in accordance with a temperature rise from a normal temperature in a manner such that the contacts (12, 22) shift from an open state to a connected state, the contacts (12, 22) being provided on a free-end side and located on the individual surfaces of the first and second temperature sensing sections that face each other; first, second, and third terminals (31, 32, 33) connected to an external circuit; and an insulation section (40) that maintains the first, second, and third terminals (31, 32, 33) in an insulated state, wherein the first temperature sensing section (10) includes first and second regions (A1, A2) with a slit (13) that extends from a fixed-end side to the free-end side provided therebetween, the first terminal (31) is connected to the first region (A1), the second terminal (32) is connected to the second region (Continued)

(A2), and the third terminal (33) is connected to the second temperature sensing section (20).

6 Claims, 5 Drawing Sheets

(51) Int. Cl.
  *H01H 79/00* (2006.01)
  *H02H 9/02* (2006.01)

(58) Field of Classification Search
  CPC .... H01H 37/12; H01H 59/0009; H01H 47/02; H01H 71/16; H01H 71/123; H01H 61/02; H01H 61/013; H01H 2037/5463; H01H 2037/5445; H01H 2037/5481; H01H 1/504; H01H 1/00; H01H 1/0036; H02H 9/04; H02H 9/30; H02H 9/54; H02H 9/541; H02H 9/542
  See application file for complete search history.

(56) References Cited

U.S. PATENT DOCUMENTS

| | | |
|---|---|---|
| 2012/0001721 A1 | 1/2012 | Takeda |
| 2012/0212210 A1 | 8/2012 | Takeda |

FOREIGN PATENT DOCUMENTS

| | | |
|---|---|---|
| JP | 03291821 A | 12/1991 |
| JP | 2000285782 A | 10/2000 |
| JP | 2005235446 A | 9/2005 |
| JP | 5342641 B2 | 8/2013 |
| WO | WO-2011055577 A1 | 5/2011 |

OTHER PUBLICATIONS

"International Application Serial No. PCT/JP2017/046730, Written Opinion dated Apr. 3, 2018", (Apr. 3, 2018), 5 pgs.
"Chinese Application Serial No. 201780088830.6, Office Action dated Dec. 25, 2020", w/ English Translation, (Dec. 25, 2020), 12 pgs.

\* cited by examiner

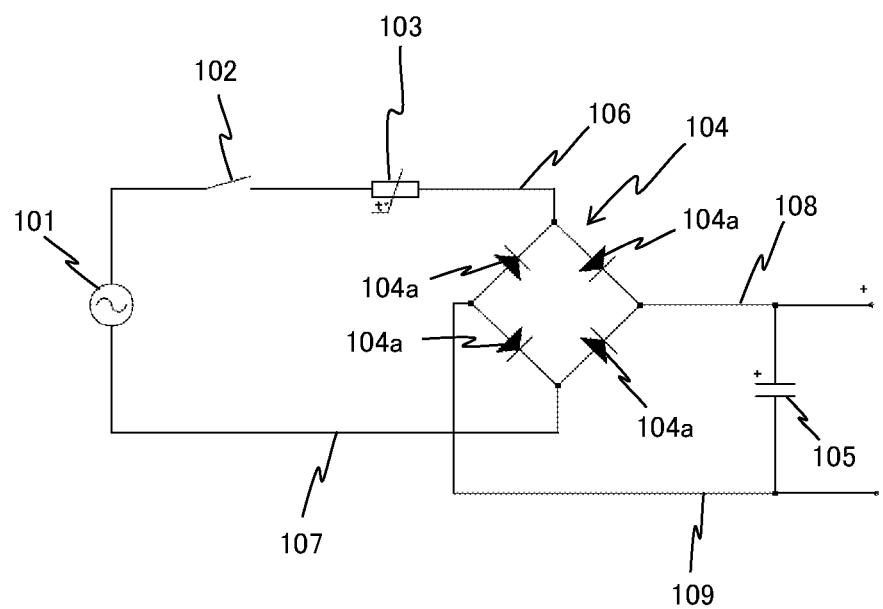
F I G. 5

TEMPERATURE ACTUATED SWITCH

PRIORITY APPLICATIONS

This application is a U.S. National Stage Filing under 35 U.S.C. 371 from International Application No. PCT/JP2017/046730, filed on Dec. 26, 2017, and published as WO2018/193667 on Oct. 25, 2018, which claims the benefit of priority to Japanese Application No. 2017-081987, filed on Apr. 18, 2017; the benefit of priority of each of which is hereby claimed herein, and which applications and publication are hereby incorporated herein by reference in their entirety.

TECHNICAL FIELD

The present invention relates to a temperature actuated switch that includes three terminals connected to an external circuit.

BACKGROUND ART

Power supply circuits supplied with power from a commercial power supply so as to actuate a DC circuit have conventionally been provided with a current limiting resistor for limiting a large current flowing through a capacitor of a smoothing circuit. FIG. 5 depicts an example of a power supply circuit that includes such a current limiting resistor.

FIG. 5 illustrates a power supply circuit in accordance with a reference art.

The power supply circuit depicted in FIG. 5 includes an AC power supply 101, a power supply switch 102, a current limiting resistor 103, a rectification circuit 104, a capacitor 105, wires 106 and 107, and output wires 108 and 109. The current limiting resistor 103 is provided to limit a rush current from the AC power supply 101 flowing through the capacitor 105 so as to prevent the service lives of the power supply switch 102 and rectification elements 104a, i.e., diodes, of the rectification circuit 104 from being adversely affected.

The resistance value of the current limiting resistor 103 is decreased to a residual resistance, i.e., a stable resistance, owing to a steady current after the limitation of the rush current but does not become 0Ω, and hence power is consumed and heat generation continues. Assume that the rush current is limited using a relay or a semiconductor. Using a relay will lead to power consumption due to the relay continuing to be actuated, thereby generating heat. Using a semiconductor will involve providing an additional circuit, thereby increasing the cost of the power supply circuit.

Accordingly, switches that limit a rush current by using an inversion-type bimetal having hysteresis characteristics have been proposed (see, for example, patent document 1).

PRIOR ART DOCUMENT

Patent Document

Patent document 1: Japanese Patent No. 5342641

SUMMARY OF THE INVENTION

Problems to be Solved by the Invention

A temperature setting can be easily made for a switch that uses the above-described inversion-type bimetal. However, such a switch has a difference between an operating temperature at which the bimetal is inverted and a recovery temperature and thus has had a problem of a long recovery time due to a temperature difference from the operation to recovery. Even after the operation temperature has been reached, it has taken a time before the bimetal is inverted, thereby extending the operating time.

An object of the present invention is to provide a temperature actuated switch capable of reducing the operating time and the recovery time.

Means for Solving the Problems

In one aspect, a temperature actuated switch includes: first and second temperature sensing sections that each include a contact and a thermally deformable member that is bent in accordance with a temperature rise from a normal temperature in a manner such that the contact shifts from an open state to a connected state, the contacts being provided on a free-end side and located on the individual surfaces of the first and second temperature sensing sections that face each other; first, second, and third terminals connected to an external circuit; and an insulation section that maintains the first, second, and third terminals in an insulated state, wherein the first temperature sensing section includes first and second regions with a slit that extends from a fixed-end side to the free-end side provided therebetween, the first terminal is connected to the first region, the second terminal is connected to the second region, and the third terminal is connected to the second temperature sensing section.

Effect of the Invention

The present invention allows the operating time and the recovery time to be reduced.

BRIEF DESCRIPTION OF THE DRAWINGS

FIG. 5 illustrates a power supply circuit in accordance with a reference art.

DESCRIPTION OF EMBODIMENTS

Figure 1:
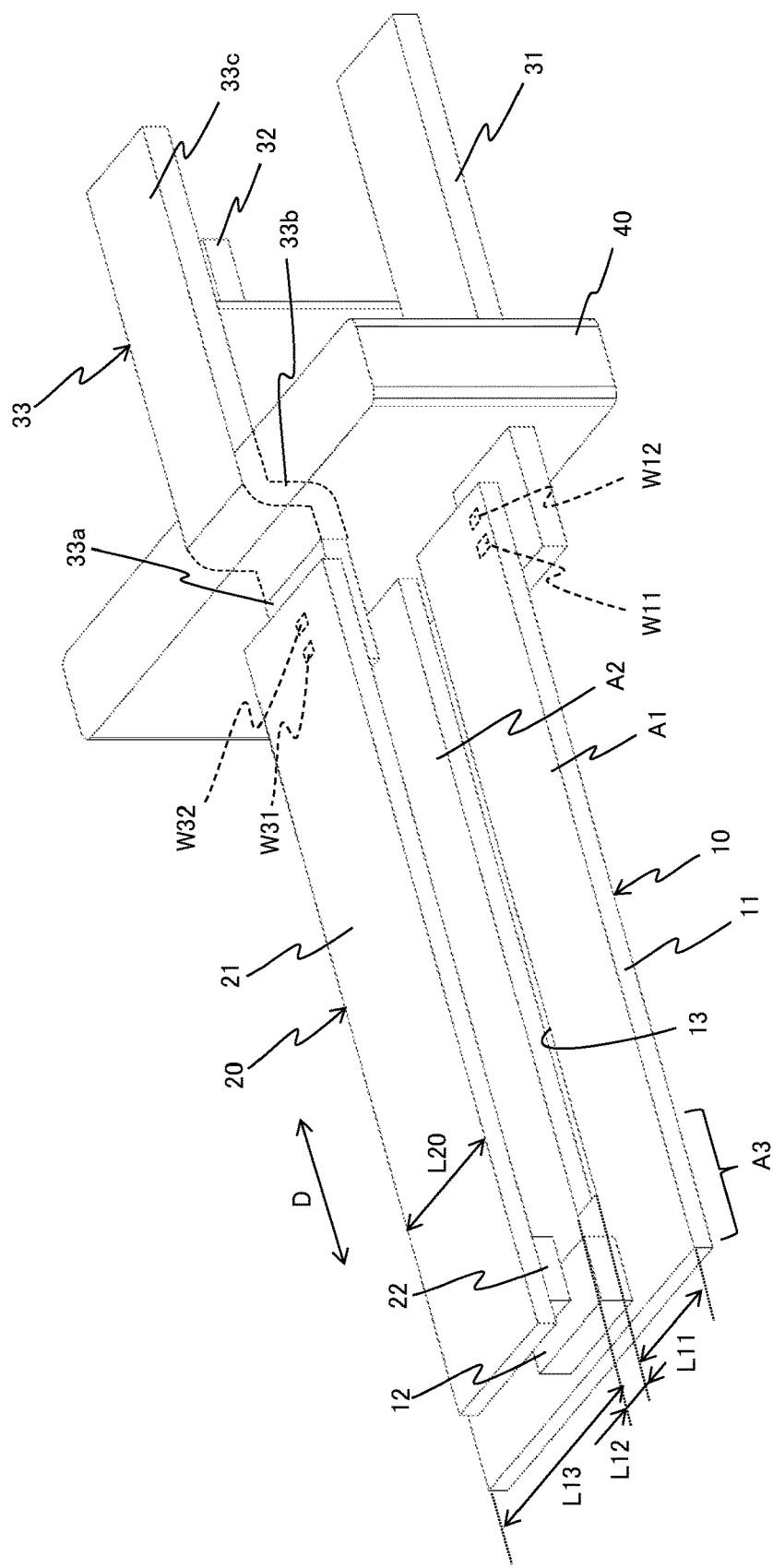
FIG. 1 is a perspective view illustrating a temperature switch in accordance with an embodiment with an insulation case removed therefrom (example 1)

The following describes a temperature actuated switch in accordance with an embodiment of the invention by referring to the drawings.

Figure 2:
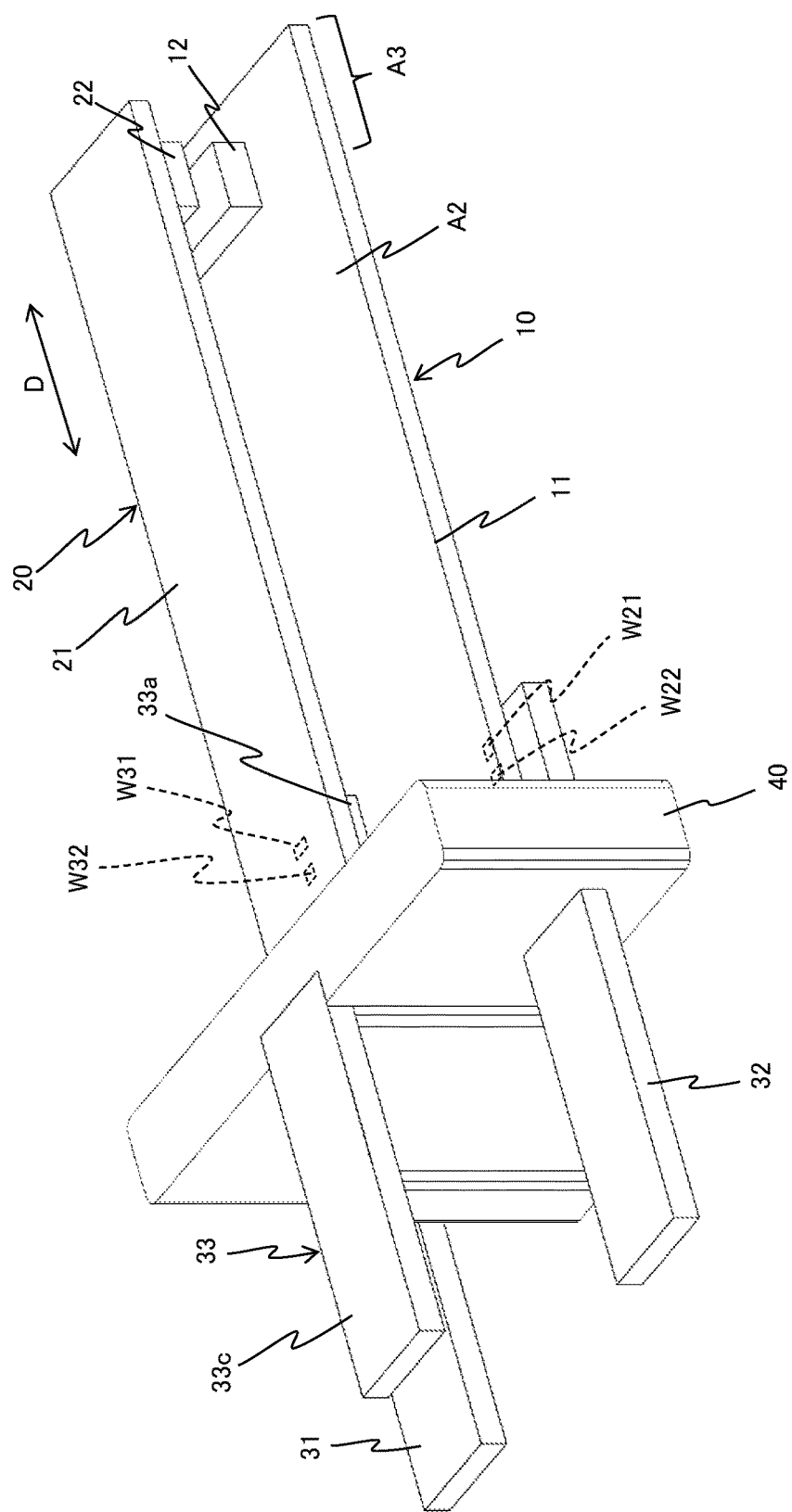
FIG. 2 is a perspective view illustrating a temperature switch in accordance with an embodiment with an insulation case removed therefrom (example 2)

FIGS. 1 and 2 are perspective views illustrating a temperature switch 1 in accordance with an embodiment with an insulation case 50 removed therefrom.

Figure 3:
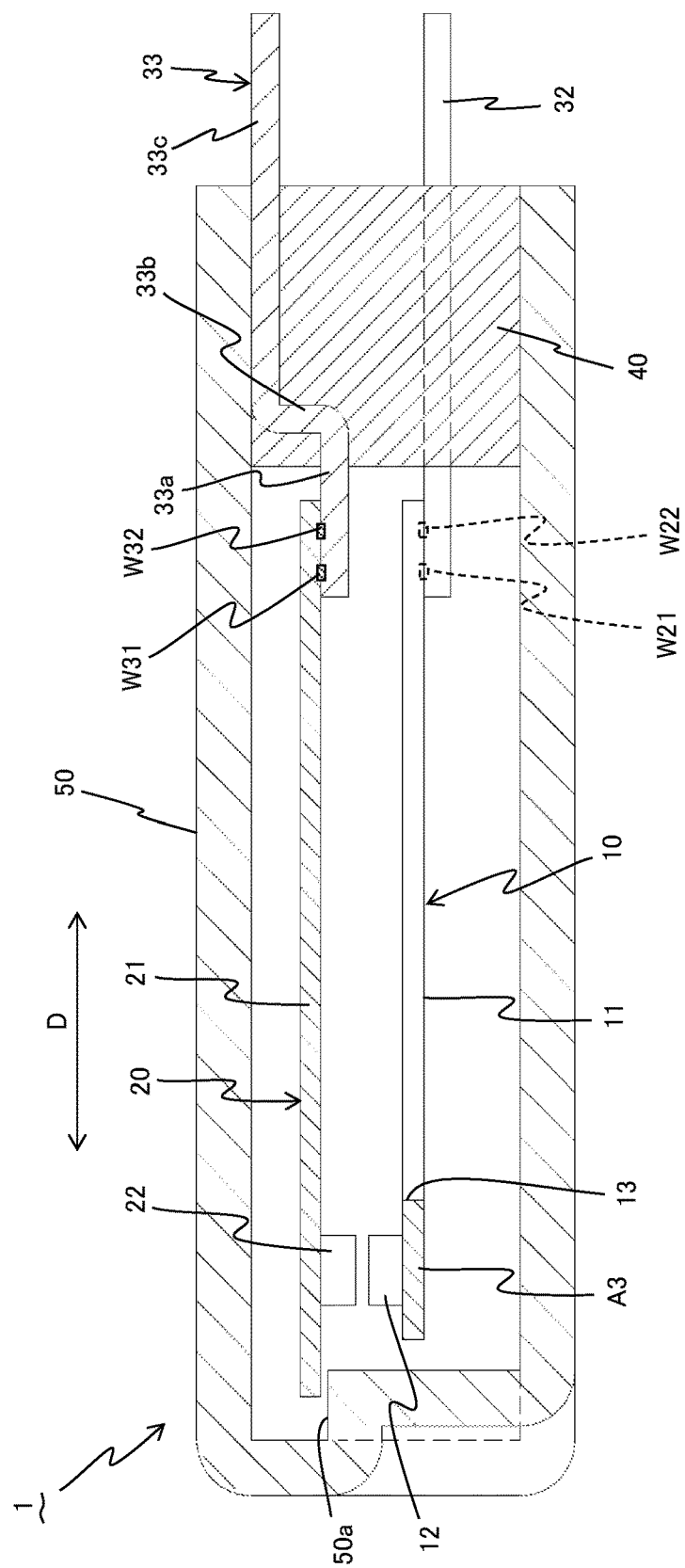
FIG. 3 is a cross-sectional view illustrating a temperature actuated switch in accordance with an embodiment.

FIG. 3 is a cross-sectional view illustrating a temperature actuated switch 1 in accordance with an embodiment.

As depicted in FIGS. 1-3, the temperature actuated switch 1 includes a first temperature sensing section 10, a second temperature sensing section 20, a first terminal 31, a second terminal 32, a third terminal 33, an insulation section 40, and an insulation case 50 (see FIG. 3).

The first temperature sensing section 10 includes a first bimetal 11 and a contact 12. The second temperature sensing section 20 includes a second bimetal 21 and a contact 22. In the examples of FIGS. 1-3, the first temperature sensing section 10 is located directly below above the second temperature sensing section 20, and hence the first temperature sensing section 10 and the second temperature sensing section 20 face each other in the vertical direction.

For example, the first bimetal 11 and the second bimetal 21 may each be formed by joining two tabular alloys having different thermal expansion coefficients together. Material for the first bimetal 11 and the second bimetal 21 may be selected in consideration of, for example, width, board thickness, bending modulus, or resistivity. As will be described in detail hereinafter, for stable actuations, including recovery, the first bimetal 11 and the second bimetal 21 need to satisfy a condition in balance between actuating forces generated when the first bimetal 11 and the second bimetal 21 are bent. To achieve this balance, the first bimetal 11 and the second bimetal 21 will desirably be the same in material and thickness. As an example, the first bimetal 11 and the second bimetal 21 may have a thickness of 0.3 mm. The first temperature sensing section 10 and the second temperature sensing section 20, which include the first bimetal 11 and the second bimetal 21, may include a thermally deformable member such as a tri-metal formed from three layers of alloy, in addition to the first bimetal 11 and the second bimetal 21.

The first bimetal 11 includes, in a longitudinal direction D, one end that is a fixed end connected to the first terminal 31 and the second terminal 32 and another end that is a free end. The second bimetal 21 includes, in the longitudinal direction D, one end that is a fixed end connected to the third terminal 33 and another end that is a free end. The first terminal 31, the second terminal 32, and the third terminal 33 are connected to a power supply circuit 100 depicted in FIG. 4 which is an example of the external circuit (descriptions of the power supply circuit 100 will be given hereinafter).

The contacts 12 and 22 are provided on the surfaces of the first bimetal 11 and the second bimetal 21 that face each other, i.e., the top surface of the first bimetal 11 and the bottom surface of the second bimetal 21, in a manner such that the contact 12 and the contact 22 face each other. The first bimetal 11 and the second bimetal 21 assume, for example, a planar shape at a normal temperature and are bent in such a manner as to cause the contacts 12 and 22 to approach each other by means of a Joule heat generated in response to a current flowing through the first bimetal 11 and the second bimetal 21.

The first temperature sensing section 10 (first bimetal 11) includes a slit 13 extending in the longitudinal direction D from the fixed-end side to the free-end side. The first bimetal 11 includes a first region A1 and a second region A2 with the slit 13 positioned therebetween. The first bimetal 11 also includes a third region A3 located between the leading end of the slit 13 in the longitudinal direction D (the edge portion of the first temperature sensing section 10 on the free-end side) and the free end of the first temperature sensing section 10. At least a portion of the first region A1 desirably faces the second bimetal 21 (second temperature sensing section 20). The contact 12 of the first temperature sensing section 10 is located within the third region A3.

In one possible configuration, the first temperature sensing section 10 may not include the slit 13, the first bimetal 11 may include the first region A1 (or the first region A1 and the third region A3) alone, and the second region A2 may be separate from the first bimetal 11 (e.g., provided on a bimetal located below the first bimetal 11 (i.e., located on the opposite side from the second bimetal 21)). However, this would lead to a complicated structure due to the second region A2 being a discrete body.

Two points spaced apart from each other in the longitudinal direction D (examples of the plurality of points) that are provided within the first region A1 of the first bimetal 11, e.g., welds W11 and W12, are connected to the first terminal 31. Two points spaced apart from each other in the longitudinal direction D (examples of the plurality of points) that are provided within the second region A2 of the first bimetal 11, e.g., welds W21 and W22, are connected to the second terminal 32. Two points spaced apart from each other in the longitudinal direction D (examples of the plurality of points) that are provided within the second region A2 of the second bimetal 21, e.g., welds W31 and W32, are connected to the third terminal 33. In these ways, the first bimetal 11 is connected to the first terminal 31 and the second terminal 32 by a plurality of points spaced apart from each other in the longitudinal direction D, and the second bimetal 21 is connected to the third terminal 33 by a plurality of points spaced apart from each other in the longitudinal direction D. This is because when the contacts 12 and 22 are in contact with each other, a large stress may be applied, depending on the energization state, to points at which the first bimetal 11 is affixed (connected) to the first terminal 31 and the second terminal 32 and a point at which the second bimetal 21 is affixed (connected) to the third terminal 33. As will be described hereinafter, the operating point would be changed every time an operation is performed if the first bimetal 11 or the second bimetal 21 did not return to the original state in a recovering behavior when the contacts 12 and 22 are placed in the open state owing to the cooling of the first region A1 of the first bimetal 11 and the second temperature sensing section 20 in accordance with the stopping of a current. The connection method described above is also directed to stabilizing this actuation.

The first region A1, the slit 13, the second region A2, and the second temperature sensing section 20, all of which are provided on either of the surfaces of the first temperature sensing section 10 and the second temperature sensing section 20 that face each other, respectively have length L11, length L12, length L13, and length L20 as lengths (widths) orthogonal to the longitudinal direction D. The total of lengths L11, L12, and L13 is greater than length L20. For example, the ratio between lengths L11 and L13 may be 1:2, or length L11 may be greater than length L13. The lengths may be determined, as appropriate, in accordance with operating characteristics or energization-based maintenance conditions. The total of lengths L11 and L13 is, for example, length L20 times a value of 2 to 3. Keeping this total length within this range allows the length L11 of the first region A1, i.e., the width obtained by the slit 13 dividing the first bimetal 11, to be equivalent to, or at most about 1.5 times of, the length L20 of the second temperature sensing section 20. However, the relationship in force between the first bimetal 11 and the second bimetal 21 pertains to not only width but also an actuation length (longitudinal direction D). A greater actuation length will lead to larger displacement to be caused by a bend and reduced output. A less actuation length will lead to smaller displacement to be caused by a bend and increased output. The relationship in actuation length is similar to the above-described relationship in width and will be desirably set to a value at which the connected state of the contacts 12 and 22 can be sufficiently maintained.

At a normal temperature (e.g., 25° C.), the contact 12 of the first temperature sensing section 10 and the contact 22 of the second temperature sensing section 20 are in an open state in which the contact 12 and the contact 22 are spaced apart from each other. When the first temperature sensing section 10 is bent by a Joule heat as described above, the contact 12 comes into contact with the contact 22, thereby achieving a connected state. An operating temperature at which the contacts 12 and 22 shift from the open state to the connected state can be adjusted in accordance with, for example, the distance between the contacts 12 and 22 at a normal temperature and the material and shape of the first temperature sensing section 10 and the second temperature sensing section 20.

The first terminal 31, the second terminal 32, and the third terminal 33 may have any shape. The first terminal 31 and the second terminal 32 may assume a planar shape. The third terminal 33 includes a bimetal-side planar section 33a and an external-circuit-side planar section 33c that are parallel to each other (e.g., both horizontally extend) and a perpendicular section 33b located between, and perpendicular to, the bimetal-side planar section 33a and the external-circuit-side planar section 33c. Accordingly, the third terminal 33 is such that the bimetal-side planar section 33a and the perpendicular section 33b form a portion bent at right angle and the perpendicular section 33b and the external-circuit-side planar section 33c form a portion bent at right angle. The perpendicular section 33b is located within the insulation section 40, which is T-shaped when seen in a plane view. The first terminal 31 and the second terminal 32 extend through the insulation section 40.

The insulation case 50 accommodates the first temperature sensing section 10, the second temperature sensing section 20, the first terminal 31, the second terminal 32, the third terminal 33, and the insulation section 40. The first terminal 31, the second terminal 32, and the third terminal 33 each partially extend out of the insulation case 50.

The insulation case 50 has a displacement regulation section 50a that is, for example, a protruding section located therein. The displacement regulation section 50a regulates, at a normal temperature, displacement of the second temperature sensing section 20 to such a position that the contact 22 of the second temperature sensing section 20 is in contact with the contact 12 of the first temperature sensing section 10.

Figure 4:
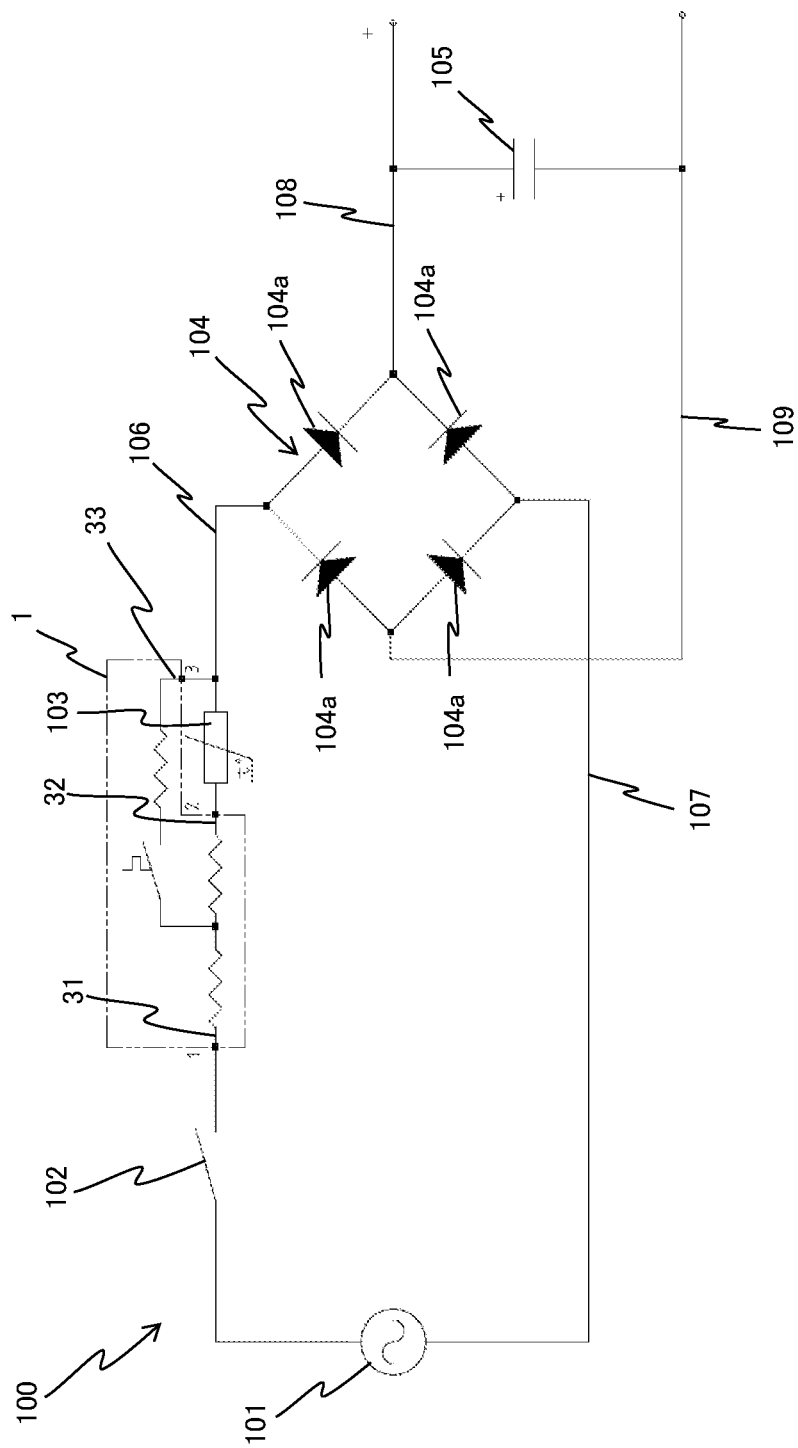
FIG. 4 illustrates a power supply circuit that includes a temperature actuated switch in accordance with an embodiment.

FIG. 4 illustrates the power supply circuit 100 that includes the temperature actuated switch 1.

As depicted in FIG. 4, the power supply circuit 100 includes the temperature actuated switch 1, the AC power supply 101, the power supply switch 102, the current limiting resistor 103, the rectification circuit 104, the capacitor 105, the wires 106 and 107, and the output wires 108 and 109.

Closing the power supply switch 102 of the power supply circuit 100 causes an alternating current to be input from the AC power supply 101 to the primary side of the rectification circuit 104 via the wires 106 and 107. The alternating current input to the primary side is rectified by the four rectification elements 104a, diodes, of the rectification circuit 104 and output from the secondary side via the output wires 108 and 109.

The direct current output from the secondary side is originally a pulsating current. Accordingly, this direct current is smoothened by a smoothing circuit of the capacitor 105, which is connected in parallel to the rectification circuit 104 between the output wires 108 and 109, and then supplied to an external load via terminals provided at ends of the output wires 108 and 109.

A switch formed by the contacts 12 and 22 is disposed in parallel to the current limiting resistor 103, which is, for example, a fixed resistor or a power thermistor. The power supply circuit 100 is such that the first terminal 31 is connected between the AC power supply 101 and the current limiting resistor 103, the second terminal 32 is connected to the power-supply-101 side of the current limiting resistor 103, i.e., connected between the first terminal 31 and the current limiting resistor 103, and the third terminal 33 is connected to the load side of the current limiting resistor 103, i.e., connected between the current limiting resistor 103 and the capacitor 105.

As soon as the power is turned on, i.e., as soon as the power supply switch 102 is closed, a current will flow through the first terminal 31, the first temperature sensing section 10 (the first region A1, the third region A3, and then the second region A2), the second terminal 32, the current limiting resistor 103, the rectification circuit 104, and the capacitor 105 in this order; and a large charging current would instantaneously flow through the capacitor 105, which carries no electrical charge, but the rush current is limited by the current limiting resistor 103. Although the third terminal 33 is connected to the load side of the current limiting resistor 103, no current flows through the third terminal 33 because the contacts 12 and 22 are in the open state.

The first bimetal 11 is bent in a manner such that the contact 12 approaches the contact 22 of the second temperature sensing section 20 owing to a Joule heat generated in accordance with a current flowing between the first terminal 31 and the second terminal 32. As a result, the contact 12 is brought into contact with the contact 22.

After the contact 12 of the first temperature sensing section 10 and the contact 22 of the second temperature sensing section 20 have been placed in the connected state, the second bimetal 21 and the first bimetal 11 are pressed against each other in such a manner as to maintain the connected state of the contacts 12 and 22 by means of a Joule heat generated by a current diverted from the first temperature sensing section 10. In this situation, since the contacts 12 and 22 have already been in the connected state, the second bimetal 21, which would be bent in such a direction that the first bimetal 11 and the second bimetal 21 are pressed against each other, has been pressed by the first bimetal 11 and thus may exhibit essentially no bending behavior or maintain the original shape such that the second bimetal 21 is not pressed and bent by the first bimetal 11 in a direction opposite from the first bimetal 11. In this way, the contacts 12 and 22 can be maintained in the connected state owing to the force for bending the second bimetal 21 toward the first bimetal 11 even when the second bimetal 21 is not sufficiently bent toward the first bimetal 11.

A channel passing through the current limiting resistor 103, i.e., a channel passing through the second region A2 and the second terminal 32, has larger resistance than a channel bypassing the current limiting resistor 103, i.e., a channel passing through the second bimetal 21 and the third terminal 33, due to the presence of a resistance value of the current limiting resistor 103 that is based on saturated current and temperature, i.e., a resistance value called residual resistance. Hence, the current flowing through the current limiting resistor 103 is decreased in accordance with the resistance ratio.

Bypassing the current limiting resistor 103 stops heat generation of the current limiting resistor 103, and the current limiting resistor 103 thus starts to cool down and eventually returns to the original resistance. Meanwhile, the first region A1 of the first temperature sensing section 10 and the second temperature sensing section 20 remain energized and thus generate heat, and the current, which changes in accordance with the condition of the load, becomes about $\frac{1}{10}$ of a current resulting from heat generation of the current limiting resistor 103 (power thermistor) alone. For example, a residual resistance at a power thermistor with a room-temperature resistance of 10Ω may be 0.6Ω at 3 A. In the present embodiment, a channel extending from the first terminal 31 via the first region A1 and the second temperature sensing section 20 to the third terminal 33 has an internal resistance of about 60 mΩ, i.e., almost $\frac{1}{10}$ of the residual resistance of the power thermistor. The residual resistance changes with, for example, the size or characteristics of the current limiting resistor 103 or a current flowing therethrough, and the internal resistance of the temperature actuated switch 1 also changes with the size of or material for the first bimetal 11 and the second bimetal 21; and the resistance that can be maintained through energization is about $\frac{1}{10}$ of the residual resistance as described above. The connected state of the contacts 12 and 22 is stabilized when the current of the temperature actuated switch 1 is sufficient to cause the first bimetal 11 and the second bimetal 21 to be bent in such a direction that these bimetals are pressed against each other.

As described above, the resistance of the channel passing through the current limiting resistor 103 is higher than that of the channel bypassing the current limiting resistor 103. Accordingly, a current flowing through the first terminal 31, the first region A1, the third region A3, the second region A2, and the second terminal 32 flow through, after the contacts 12 and 22 are connected, the first terminal 31, the first region A1, the third region A3, the contact 12, the contact 22, the second bimetal 21, and the third terminal 33. Accordingly, after the contacts 12 and 22 have been shifted to the connected state, the current flows while bypassing the current limiting resistor 103.

The time before the bypassing in this operation depends on the interval between the contacts 12 and 22 or the magnitude of a current flowing through the first bimetal 11. There is a static property what is called an operating temperature that is a temperature at which the first bimetal 11 is bent by means of a temperature (Joule heat) and the contact 12 comes into contact with the contact 22, but the contacting based on temperature alone does not allow the current to stably flow. However, an arrangement may be made such that as in the present embodiment, a current flows both the first bimetal 11 and the second bimetal 21, and the second bimetal 21 is bent owing to the Joule heat of the second bimetal 21 in such a direction that the second bimetal 21 approaches the first bimetal 11 (first temperature sensing section 10), thereby applying a force of a warp in the first bimetal 11 and the second bimetal 21 in such a manner as to increase the contact force of the contacts 12 and 22. In this way, the first bimetal 11 and the second bimetal 21 are bent in such a direction that these bimetals are pressed against each other. This leads to the stable connected state of the contacts 12 and 22. Even when the contact between the contacts 12 and 22 is unstable, heat generated at the contacts 12 and 22 will promote the stabilization of the contact.

The flowing current has a dynamic property such that when an instantaneous rush current flows, the temperature of the first bimetal 11 is increased at a slightly delayed moment, and the first bimetal 11 is bent, thereby bringing the contact 12 into contact with the contact 22 of the second temperature sensing section 20. When the contacts 12 and 22 have been placed in the connected state, a current starts to flow through the second bimetal 21, and this current causes the first bimetal 11 and the second bimetal 21 to be bent in such a direction that these bimetals come into contact with each other, thereby achieving a stable current flow. According to such a creep operation, the contact force of the contacts 12 and 22 is weak at the moment at which these contacts come into contact with each other, but the contact force will increase owing to the occurrence of energization as described above, and this will lead to stable energization. When the current flow stops even for a moment, the stable contact will be lost, and the energization between the contacts 12 and 22 will stop, with the result that energization from the first region A1 to the second region A2 will occur, thereby leading to energization on the current-limiting-resistor-103 side. Such an operation can rapidly recover, and hence the current limitation by the current limiting resistor 103 is enabled, thereby allowing protection of the power supply circuit 100 to function effectively.

Even when the charging of the capacitor 105 has been completed and the current has been placed in a steady state, the connected state of the contacts 12 and 22 is maintained when a current that can maintain the connected state flows. When the current cannot maintain the connected state, the contacts 12 and 22 will return to the open state, and the current will flow to the current limiting resistor 103 via the second region A2 and the like; however, when the temperature of the first bimetal 11 is increased by a Joule heat, the first bimetal 11 is bent and approaches the second bimetal 21 again, thereby placing the contacts 12 and 22 in the connected state. When the steady current is small, the first bimetal 11 is not sufficiently bent and the contacts 12 and 22 are not placed in the connected state, but heat generation of the current path is reduced since the current is small. When the steady current is large, the holding current also becomes large, and hence the width L11 of the first region A1 may be increased by changing the position of the slit 13 or by changing the width of the second bimetal 21.

When energization stops, the heat generation based on the current stops, and hence the first bimetal 11 and the second bimetal 21 are no longer bent. The time required for this recovery is far shorter than that in a situation in which the conventional hysteresis-based bimetals are used (see patent document 1), i.e., a few tens of seconds. The recovery time in the present embodiment is about 8 seconds in comparison with, for example, a recovery time of 50 seconds at a current of 2.5 A in the prior art. Accordingly, simply stopping the current only for a short time allows the first bimetal 11 and the second bimetal 21, which have been bent in a direction for maintaining energization, to be placed back in the original state. Even if the contacts 12 and 22 are welded by any chance, the weld will be broken by a force generated when the first bimetal 11 is returning to the original state from the bent state because displacement of the second temperature sensing section 20 (second bimetal 21) is regulated by the displacement regulation section 50a while the contacts 12 and 22 are shifting to the open state. The width of the open side of the first bimetal 11 (the total of lengths L11, L12, and L13, or the total of lengths L11 and L13 excluding the slit 13) is longer than the width of the second bimetal 21 (length L20), and hence the output of displacement becomes large.

In the embodiment described above, the temperature actuated switch 1 includes: the first and second temperature sensing sections 10 and 20, which include the contacts 12 and 22 and thermally deformable members (first bimetal 11, second bimetal 21) that are bent in accordance with a temperature rise from a normal temperature in a manner such that the contacts 12 and 22 shift from an open state to a connected state, the contacts 12 and 22 being provided on the free-end side and located on the individual surfaces of the first and second temperature sensing sections that face each other; the first, second, and third terminals 31, 32, and 33, which are connected to an external circuit; and the insulation section 40, which maintains the first, second, and third terminals 31, 32, and 33 in an insulated state. The first temperature sensing section 10 includes first and second regions A1 and A2 with a slit 13 that extends from the fixed-end side to the free-end side provided therebetween. The first terminal 31 is connected to the first region A1. The second terminal 32 is connected to the second region A2. The third terminal 33 is connected to the second temperature sensing section 20.

Accordingly, as described above, in accordance with a temperature rise from a normal temperature that is caused by energization, the first temperature sensing section 10 is displaced in a manner such that the contact 12 of the first temperature sensing section 10 comes into contact with the contact 22, and after the contacts 12 and 22 have been placed in the connected state, the second temperature sensing section 20 generates heat in response to energization, with the result that the contact 22 is also displaced to press back the contact 12. This allows a stable connected state to be achieved in a short operating time. When the energization has stopped and the contacts 12 and 22 have been shifted from the connected state to the open state, the energization of the second temperature sensing section 20 stops, and the second temperature sensing section 20 is displaced in a manner such that the contact 22 of the second temperature sensing section 20 returns to the position distant from the contact 12. The heat generation of the first temperature sensing section 10 caused by energization also stops, and the contact 12 is displaced to return to the original state, i.e., the open state. Accordingly, the time required for the recovery from the connected state can be shortened using the displacement of both the first temperature sensing section 10 and the second temperature sensing section 20. Accordingly, the present embodiment allows the operating time and the recovery time to be shortened.

In the present embodiment, the first bimetal 11 is bent by a Joule heat generated by a current flowing between the first terminal 31 and the second terminal 32, in a manner such that the contact 12 of the first temperature sensing section 10 approaches the contact 22 of the second temperature sensing section 20; and after the contact 12 of the first temperature sensing section 10 and the contact 22 of the second temperature sensing section 20 have been shifted to the connected state, the second bimetal 21 and the first bimetal 11 are pressed against each other in such a manner as to maintain the connected state owing to a Joule heat generated in accordance with a current being diverted from the first temperature sensing section 10. Accordingly, the operating time and the recovery time can be reliably shortened.

In the present embodiment, the temperature actuated switch 1 further includes the displacement regulation section 50a, which regulates, at a normal temperature, displacement of the second temperature sensing section 20 to such a position that the contact 22 of the second temperature sensing section 20 is in contact with the contact 12 of the first temperature sensing section 10. Accordingly, even if the contacts 12 and 22 are welded together, the weld will be broken by a force generated when the first bimetal 11 is returning to the original state from the bent state while the contacts 12 and 22 are shifting from the connected state to the open state.

In the present embodiment, the power supply circuit 100, i.e., an example of the external circuit, includes the AC power supply 101, the rectification elements 104a, which convert an alternating current supplied from the AC power supply 101 into a direct current, the capacitor 105, and the current limiting resistor 103, which limits a rush current flowing through the capacitor 105. The first terminal 31 is connected between the AC power supply 101 and the current limiting resistor 103 within the power supply circuit 100. The second terminal 32 is connected between the first terminal 31 and the current limiting resistor 103 within the power supply circuit 100. The third terminal 33 is connected between the current limiting resistor 103 and the capacitor 105 within the power supply circuit 100. Accordingly, in a configuration in which the current limiting resistor 103 prevents a rush current from flowing through the capacitor 105, a current bypasses the channel passing through the current limiting resistor 103 so that the current limiting resistor 103 can be prevented from generating heat due to a steady current, thereby preventing power consumption and heat generation of the current limiting resistor 103.

In the present embodiment, at least a portion of the first region A1 of the first temperature sensing section 10 (first bimetal 11) faces the second temperature sensing section 20. Accordingly, when the first region A1 of the first temperature sensing section 10 and the second temperature sensing section 20 are displaced in a such direction that the first region A1 and the second temperature sensing section 20 are pressed against each other, the connected state of the contact 12 and the contact 22 can be stabilized.

In the present embodiment, the first temperature sensing section 10 or the second temperature sensing section 20 is connected to the first terminal 31, the second terminal 32, or the third terminal 33 by a plurality of points (e.g., welds W11, W12, W21, W22, W31, and W32) spaced apart from each other in the longitudinal direction D of the first temperature sensing section 10 and the second temperature sensing section 20. Accordingly, the first bimetal 11 and the second bimetal 21 can be reliably affixed even when a large force is applied to portions at which the first temperature sensing section 10 or the second temperature sensing section 20 is affixed (connected) to the first terminal 31, the second terminal 32, or the third terminal 33.

In the present embodiment, the thermally deformable member of the first temperature sensing section 10 is the first bimetal 11, the thermally deformable member of the second temperature sensing section 20 is the second bimetal 21, and the slit 13 is formed at the first bimetal 11. Accordingly, the operating time and the recovery time can be reduced as described above owing to the simple configuration that uses the first bimetal 11 and the second bimetal 21.

Although embodiments of the present invention have been described, the invention falls within the scope of the claims and equivalents thereof. The following indicates, as appendixes, the inventions recited in the claims as originally filed.

APPENDIX 1

A temperature actuated switch comprising:
first and second temperature sensing sections that each include a contact and a thermally deformable member that is bent in accordance with a temperature rise from a normal temperature in a manner such that the contact shifts from an open state to a connected state, the contacts being provided on a free-end side and located on individual surfaces of the first and second temperature sensing sections that face each other;

first, second, and third terminals connected to an external circuit; and an insulation section that maintains the first, second, and third terminals in an insulated state, wherein the first temperature sensing section includes first and second regions with a slit that extends from a fixed-end side to the free-end side provided therebetween, the first terminal is connected to the first region, the second terminal is connected to the second region, and the third terminal is connected to the second temperature sensing section.

APPENDIX 2

The temperature actuated switch of appendix 1, wherein the thermally deformable member of the first temperature sensing section is bent by a Joule heat generated by a current flowing between the first and second terminals, in a manner such that the contact of the first temperature sensing section approaches the contact of the second temperature sensing section, and after the contacts of the first and second temperature sensing sections have been shifted to the connected state, the thermally deformable members of the first and second temperature sensing sections are pressed against each other in such a manner as to maintain the connected state owing to a Joule heat generated in accordance with a current being diverted from the first temperature sensing section.

APPENDIX 3

The temperature actuated switch of appendix 1 or 2, further comprising:

a displacement regulation section that regulates, at a normal temperature, displacement of the second temperature sensing section to such a position that the contact of the second temperature sensing section is in contact with the contact of the first temperature sensing section.

APPENDIX 4

The temperature actuated switch of any of appendixes 1-3, wherein the external circuit includes an AC power supply, rectification elements that convert an alternating current supplied from the AC power supply into a direct current, a capacitor, and a current limiting resistor that limits a rush current flowing through the capacitor, the first terminal is connected between the AC power supply and the current limiting resistor within the external circuit, the second terminal is connected between the first terminal and the current limiting resistor within the external circuit, and the third terminal is connected between the current limiting resistor and the capacitor within the external circuit.

APPENDIX 5

The temperature actuated switch of any of appendixes 1-4, wherein at least a portion of the first region faces the second temperature sensing section.

APPENDIX 6

The temperature actuated switch of any of appendixes 1-5, wherein the first or second temperature sensing section is connected to the first, second, or third terminal by a plurality of points spaced apart from each other in a longitudinal direction of the first and second temperature sensing sections.

APPENDIX 7

The temperature actuated switch of any of appendixes 1-6, wherein the thermally deformable member of the first temperature sensing section is a first bimetal, the thermally deformable member of the second temperature sensing section is a second bimetal, and the slit is formed at the first bimetal.

EXPLANATION OF THE CODES

1: Temperature actuated switch
10: First temperature sensing section
11: First bimetal
12: Contact
13: Slit
20: Second temperature sensing section
21: Second bimetal
22: Contact
31: First terminal
32: Second terminal
33: Third terminal
33$a$: Bimetal-side planar section
33$b$: Perpendicular section
33$c$: External-circuit-side planar section
40: Insulation section
50: Insulation case
50$a$: Displacement regulation section
100: Power supply circuit
101: AC power supply
102: Power supply switch
103: Current limiting resistor
104: Rectification circuit
104$a$: Rectification element
105: Capacitor
106, 107: Wire
108, 109: Output wire
A1: First region
A2: Second region
A3: Third region
D: Longitudinal direction (first temperature sensing section 10, second temperature sensing section 20)
W11, W12, W21, W22, W31, W32: Weld

The invention claimed is:

1. A temperature actuated switch comprising:
first and second temperature sensing sections that each include a contact and a thermally deformable member that is bent in accordance with a temperature rise from a normal temperature in a manner such that the contact shifts from an open state to a connected state, the contacts being provided on a free-end side and located on individual surfaces of the first and second temperature sensing sections that face each other;

first, second, and third terminals connected to an external circuit; and an insulation section that maintains the first, second, and third terminals in an insulated state, wherein the first temperature sensing section includes first and second regions with a slit that extends from a fixed-end side to the free-end side provided therebetween, the first terminal is connected to the first region, the second terminal is connected to the second region, and the third terminal is connected to the second temperature sensing section, the thermally deformable member of the first temperature sensing section is bent by a Joule heat generated by a current flowing between the first and second terminals, in a manner such that the contact of the first temperature sensing section approaches the contact of the second temperature sensing section, and after the contacts of the first and second temperature sensing sections have been shifted to the connected state, the thermally deformable members of the first and second temperature sensing sections are pressed against each other in such a manner as to maintain the connected state owing to a Joule heat generated in accordance with a current being diverted from the first temperature sensing section.

2. The temperature actuated switch of claim 1, further comprising:

a displacement regulation section that regulates, at a normal temperature, displacement of the second temperature sensing section to such a position that the contact of the second temperature sensing section is in contact with the contact of the first temperature sensing section.

3. The temperature actuated switch of claim 1, wherein the external circuit includes an AC power supply, rectification elements that convert an alternating current supplied from the AC power supply into a direct current, a capacitor, and a current limiting resistor that limits a rush current flowing through the capacitor, the first terminal is connected between the AC power supply and the current limiting resistor within the external circuit, the second terminal is connected between the first terminal and the current limiting resistor within the external circuit, and the third terminal is connected between the current limiting resistor and the capacitor within the external circuit.

4. The temperature actuated switch of claim 1, wherein at least a portion of the first region faces the second temperature sensing section.

5. The temperature actuated switch of claim 1, wherein the first or second temperature sensing section is connected to the first, second, or third terminal by a plurality of points spaced apart from each other in a longitudinal direction of the first and second temperature sensing sections.

6. The temperature actuated switch of claim 1, wherein the thermally deformable member of the first temperature sensing section is a first bimetal, the thermally deformable member of the second temperature sensing section is a second bimetal, and the slit is formed at the first bimetal.

* * * * *